United States Patent Office 3,201,324
Patented Aug. 17, 1965

3,201,324
PROCESS FOR THE MICROBIOLOGICAL OXYGEN-
ATION OF PROGESTERONE
Frederick R. Hanson and William D. Maxon, Kalamazoo,
Mich., assignors to The Upjohn Company, Kalamazoo,
Mich., a corporation of Delaware
No Drawing. Filed June 17, 1963, Ser. No. 288,520
12 Claims. (Cl. 195—51)

This invention relates to an improved process for the microbiological oxygenation of progesterone, more particularly, to the microbial 11α-hydroxylation of high concentrations of progesterone using the microorganism *Rhizopus nigricans*.

The typical strain preferred for the practice of this invention is *Rhizopus nigricans*, ATCC 6277b, available from the American Type Culture Collection, Washington, D.C. It is to be understood, however, that other strains of *Rhizopus nigricans* are suitable for the practice of this invention.

Previous attempts to employ high concentrations of comparatively insoluble steroid substrates, such as progesterone, in contact with microorganisms have encountered numerous difficulties. For example, when a steroid is added as a solution in a suitable solvent, such as propylene glycol, dimethylformamide, acetone, alcohols, etc., a limiting factor on the use of high concentrations is the toxicity of the solvent. Weaver, U.S. Patent 3,019,170, January 30, 1962, found physical damage to microbial cells a serious problem in high substrate levels when finely ground or "micronized" substrates were used with *Aspergillus ochraceus*. Weaver, in order to use high substrate levels, found it necessary to resort to special comminuting techniques to produce particles referred to as "smooths" which were disclosed as being relatively harmless to the microorganisms in the culture medium.

Heretofore, the 11α-hydroxylation of progesterone using *Rhizopus nigricans* was limited to relatively low substrate levels, the maximum being about 4 grams of substrate per liter of medium.

It has now been discovered that comminuted progesterone, having a particle size of the order defined below, prepared in conventional commercial milling equipment, e.g., a Sturtevant micronizer, can be used at greatly increased substrate levels in the 11α-hydroxylation of progesterone with *Rhizopus nigricans* under submerged aerobic fermentation conditions provided that certain selected materials are employed as the nitrogen sources. High yields (85–90% and better) of 11α-hydroxyprogesterone are thereby produced and the output of 11α-hydroxyprogesterone per batch is raised markedly, generally to the order of 5 times the throughput obtainable using conventional processes.

The improved process of this invention is of considerable economic importance. The principal advantages over the prior art processes are: (1) greatly increased product per batch, resulting in substantially reduced labor and equipment requirements. (2) Lower cost per pound of product. (3) No special comminuting equipment or comminuting processes are needed.

The improved process of this invention comprises subjecting progesterone, having a particle size of the order defined below at a substrate level in the range of 15 to 40 grams per liter, to the oxygenating activity of *Rhizopus nigricans* under submerged fermentation conditions in a medium containing assimilable sources of carbon and a source of nitrogen of the class defined below. Generally, the process of this invention is effected by first growing the microorganism in a suitable fermentation medium containing certain sources of nitrogenous growth promoting factors as defined below and an assimilable source of carbon under aerobic fermentation conditions, adding the comminuted progesterone and continuing the cultivation for sufficient time to effect the desired oxygenation.

In the practice of this invention the particle size of the progesterone used is critical. Material wherein substantially all particles are smaller than 20 microns is preferred and a particle-size distribution of 90% (by weight) smaller than 10 microns is especially advantageous in obtaining optimum yields and rates of production of 11α-hydroxyprogesterone. The progesterone can be added to the culture as a dry powder or as an aqueous suspension, either as a single feed or preferably by gradually adding the substrate slowly throughout the conversion period. For mechanical reasons, the progesterone is preferably added as an aqueous suspension. In preparing the aqueous suspension the use of dispersing agents or suspending agents is advantageous. Examples of such agents are commerically available Spans (hexitol anhydride esters of long-chain fatty acids), Tweens (polyoxyalkylene ethers of hexitol anhydride long-chain fatty acid esters), Nacconols (alkyl aryl sulfonates), Ultrawets (alkyl benzene sodium sulfates), and the like.

It is important that the microbial culture providing the oxidizing enzymes be grown under conditions resulting in profuse cell growth. The source of nitrogenous growth promoting factors utilized in the practice of this invention is critical. Those sources which are especially advantageous in promoting growth at high substrate levels are (a) soybean meals, obtainable from various commercial sources, e.g., "protein soybean meal" from Central Soya Co., Fort Wayne, Indiana, and Archer-Daniels Midland Co., Decatur, Illinois, "soybean expeller meal" from Decatur Elevator Co., Decatur, Illinois, etc.; (b) commercial yeasts, e.g., brewer's yeast, and particularly, Torula yeast; (c) fish meals, (d) cottonseed meals, (e) coconut meals, (f) commercial lactalbumin digests (Edamine), and any mixtures of one or more of these sources. Soybean meal is the preferred nitrogen source for use in the process of the invention.

The most advantageous concentration of nitrogenous growth promoting factor in the medium varies with the nitrogen content of the material employed. When soybean meal is used as the nitrogen source, the nitrogen concentration in the medium is preferably within the range of from 1 to 5 grams per liter.

Suitable energy source materials may be any conventional carbon-containing material, such as carbohydrates of the type of glycerol, glucose, fructose, dextrose, sucrose, lactose, maltose, dextrines, starches and whey. These materials may be used either in a purified state or as concentrates, such as whey concentrates, corn steep liquor, grain mashes, and the like, or as mixtures of the above.

In the improved process of this invention, the pH of the medium during conversion is preferably maintained within the range of from 3.5 to 6.5. When soybean meal is used as the nitrogen source, the pH is advantageously maintained at less than 4.5. The temperature need be maintained only within such range as supports life, active growth or enzyme activity of the fungus. A temperature between about 25° C. to about 32° C. is preferred and a temperature of about 28° C. is especially advantageous.

The time required for the 11α-hydroxylation of progesterone may vary considerably, the range of about 20 to 60 hours being practical but not limiting; 30 to 36 hours is generally satisfactory under the preferred conditions. The progress of the bioconversion and completion of the bioconversion is conventionally determined by paper strip, vapor phase or thin film chromatography [Textbook, Chromatography, Heftman (1961) Reinhold Publishing Co., New York, New York].

After completion of the steroid fermentation, the resulting 11α-hydroxyprogesterone is recovered from the fermentation reaction mixture by conventional methods. An especially advantageous manner of recovering the product involves extracting the fermentation reaction mixture, including the fermentation liquor and mycelia, with a water-immiscible organic solvent for steroids, for example, methylene chloride, chloroform, carbon tetrachloride, ethylene chloride, trichloroethylene, ether, amyl acetate, benzene, toluene, and the like. Alternatively, the fermentation liquor and mycelia can be first separated by conventional methods, e.g., filtration or centrifugation, and then separately extracted with suitable solvents. The mycelia can be extracted with either water-miscible or water-immiscible solvents. The fermentation liquor, freed of mycelia, can be extracted with water-immiscible solvents. The extracts can be combined, the solvent removed and the purified 11α-hydroxyprogesterone obtained by recrystallization of the residue from organic solvents.

The following examples are illustrative of the improved process of this invention.

*Example 1*

A ferementor was charged with a medium consisting of 150 parts soybean meal, 135 parts dextrose (Cerelose) and 4000 parts tap water. The pH was adjusted to 5.0 with sulfuric acid. A minimum quantity of lard oil was added to prevent foaming. The medium was sterilized under pressure at 122° C. for 15 minutes, cooled to about 28° C. and inoculated with 225 parts of a 24-hour vegetative growth of *Rhizopus nigricans*, ATCC 6227b, volume after inoculation 4500 parts. The medium was then agitated at about 67 r.p.m. and sparged with sterile air at the rate of 8% of the total volume per minute. After culturing at about 28° C. for 17 to 18 hours, 72 parts (16 g./l.) of progesterone, having a particle-size distribution 90% (by weight) smaller than 10 microns, was added in the following manner.

Progesterone 3.6 parts (5% of the total weight) was added as a dry powder and incubation was continued for 5 hours prior to gradual feeding of the remaining substrate which was added as aqueous slurry.

The substrate slurry was prepared by filtering 227 parts of deionized water into a sterilized tank equipped with an agitator, 2.2 parts of Ultrawet 30DS (a 25.5% aqueous solution of alkyl benzene sodium sulfate) was then added and the pH was adjusted to 5.0 with citric acid. The remaining progesterone (68.4 parts) was added to the tank with continuous agitation. After all the progesterone had been wetted, the pH was again adjusted to 5.0 with citric acid. Once the slurry was formed, intermittent use of the agitator was sufficient to hold the slurry in suspension.

The slurry was then pumped into the fermentor at a rate sufficient to complete the entire slow-feed addition in 36 hours. During the fermentation, the pH was kept between 4.0 and 4.4, and samples from the fermentor were assayed by papergram analysis at regular intervals for 11α-hydroxyprogesterone. Three hours after the last substrate was added, papergram analysis showed a yield of 70.6 parts, 94.3%, of 11α-hydroxyprogesterone.

The 11α-hydroxyprogesterone thus obtained was recovered from the fermentation medium by extraction with methylene chloride and recrystallization in accordance with conventional procedures to give 62.78 parts, 83.9%, of essentially pure 11α-hydroxyprogesterone, M.P. 164–168° C. $\alpha_D + 178.9°$ (chloroform). An additional 3.6 to 4.3 parts, 5 to 6%, of recoverable 11α-hydroxyprogesterone was contained in the mother liquors, bringing the total yield to approximately 90%.

*Example 2*

A medium was prepared consisting of 8.25 kg. of soybean meal, 7.5 kg. of dextrose (Cerelose) and 200 liters of tap water. The pH was adjusted to 5.0 with sulfuric acid and a minimum quantity of soybean oil was added to prevent foaming. The medium was sterilized at 122° C. for 15 minutes, cooled to about 28° C. and inoculated with 15 liters of a 24-hour vegetative growth of *Rhizopus nigricans*, ATCC 6227b. The volume after inoculation was about 250 l. The medium was then agitated at 280 r.p.m., aerated with sterile air at the rate of 20 liters per minute and allowed to culture for 16 hours at about 28° C. Progesterone 5 kg. (particle-size distribution 90% smaller than 10 microns by weight) was then added, the pH was adjusted to 4.0–4.4 and the fermentation was continued for an additional 49 hr. period keeping the pH within the same range. Samples were taken at regular intervals during the fermentation period and assayed by papergram analysis in order to follow the progress of the fermentation. At the end of the fermentation period, papergram analysis showed a yield of 4.25 kg., 81.0%, of 11α-hydroxyprogesterone.

The product thus obtained was recovered from the fermentation medium by adding methylene chloride in an amount equal to approximately one-third the total volume of the fermentation medium, filtering to remove the mycelium, separating and washing the methylene chloride layer with water. The solvent was then removed by distillation and the residue thus obtained was recrystallized to give 3.98 kg., 75.8%, yield of essentially pure 11α-hydroxyprogesterone; an additional 5 to 6% of 11α-hydroxyprogesterone is recoverable from the mother liquors.

*Example 3*

A medium was prepared consisting of 8.25 kg. of soybean meal, 7.5 kg. of dextrose (Cerelose) and 200 liters of tap water. The pH was adjusted to 5.0 with sulfuric acid and a minimum quantity of soybean oil was added to prevent foaming. The medium was sterilized at 122° C. for 15 minutes, cooled to about 28° C. and inoculated with 15 liters of a 24-hour vegetative growth of *Rhizopus nigricans*, ATCC 6227b. The volume after inoculation was 250 l. The medium was then agitated at 280 r.p.m., aerated with sterile air at the rate of 20 liters per minute and allowed to culture for 18 hours at about 28° C. Progesterone 4 kg. (particle-size distribution 90% less than 10 microns by weight) was then added slowly in small increments over 44 hour bioconversion period keeping the pH between 3.5–4.5. The fermentation was continued for an additional 5 hours after all of the substrate had been added. Samples were taken at regular intervals during the fermentation period and assayed by papergram analysis in order to follow the progress of the fermentation. At the end of the fermentation period, papergram analysis showed a yield of 3.4 kg., 81.0%, of 11α-hydroxyprogesterone.

The product thus obtained was recovered from the fermentation in the same manner as described in Example 2 to give 3.5 kg., 83.3%, yield of essentially pure 11α-hydroxyprogesterone, plus 5 to 6% in the mother liquors.

*Example 4*

A medium was prepared consisting of 8.25 kg. of soybean meal, 7.5 kg. of dextrose (Cerelose) and 200 liters of tap water. The pH was adjusted to 5.0 with sulfuric acid and a minimum quantity of soybean oil was added to prevent foaming. The medium was sterilized at 122° C. for 15 minutes, cooled to about 28° C. and inoculated with 15 liters of a 24-hour vegetative growth of *Rhizopus nigricans*, ATCC 6227b. The volume after inoculation was 250 l. The medium was then agitated at 280 r.p.m., aerated with sterile air at the rate of 20 liters per minute. After culturing at 28° C. for 17 hours, 4 kg. (16 g./l.) of progesterone, having a particle-size distribution 90% smaller than 10 microns by weight, was added in the following manner.

The progesterone 200 g. (5% of the total weight) was first added as a dry powder and incubation was continued for 5 hours prior to gradual feeding of the remaining substrate which was added as aqueous slurry containing 1% Ultrawet 30DS (a 25.5% aqueous solution of alkyl benzene sodium sulfate) adjusted to pH 5 with citric acid. The slurry was pumped into the fermentor at a rate sufficient to complete the entire slow-feed addition in 47 hours. During the fermentation, the pH was kept between 4.0 and 5.0 and samples from the fermentor were assayed by papergram analysis at regular intervals for 11α-hydroxyprogesterone. Three hours after the last substrate was added, papergram analysis showed a yield of 3.69 kg., 88.7% of 11α-hydroxyprogesterone.

The product thus obtained was recovered from the fermentation medium in the manner described in Example 2 to give 3.4 kg., 81.0%, yield of 11α-hydroxyprogesterone; an additional 5 to 6% is recoverable from the mother liquors.

*Example 5*

A medium was prepared consisting of 12.5 kg. of brewer's yeast, 13.75 kg. of dextrose (Cerelose) and 200 liters of tap water. The pH was adjusted to 5.0 with sulfuric acid and a minimum quantity of lard oil was added to prevent foaming. The medium was sterilized at 122° C. for 15 minutes, cooled to about 28° C. and inoculated with 15 liters of a 24-hour vegetative growth of *Rhizopus nigricans*, ATCC 6227b. The volume after inoculation was approximately 250 l. The medium was then agitated at 280 r.p.m., aerated with sterile air at the rate of 12.5 liters per minute and allowed to culture for 12½ hours at about 28° C. Progesterone 5 kg. (particle-size distribution 90% smaller than 10 microns by weight) was then added, the pH adjusted to 4.0–4.4 and the fermentation was continued for an additional 73 hr. period. Samples were taken at regular intervals during the fermentation period and assayed by papergram analysis in order to follow the progress of the fermentation. At the end of the fermentation period, papergram analysis showed a yield of 4.15 kg., 79.1%, of 11α-hydroxyprogesterone.

*Example 6*

A shake flask containing 100 ml. of a medium consisting of 5.0 g. of cottonseed meal and 5.5 g. of Cerelose was adjusted to pH 5, sterilized and inoculated with a 24-hr. growth of *Rhizopus nigricans*, ATCC 6227b. The medium was placed on a rotary shaker and allowed to culture for 15½ hours at about 28° C. Progesterone 2.0 g. (90% smaller than 10 microns by weight) was then added, the pH adjusted to 4.0–4.4 and the fermentation continued for 48 hours at about 28° C. Papergram analysis showed an 83.2% yield, 1.68 g. of 11α-hydroxyprogesterone.

*Example 7*

A shake flask containing 100 ml. of an aqueous medium consisting of 3.7 g. of fish meal and 5.5 g. of dextrose (Cerelose) was adjusted to pH 4.0, sterilized and inoculated with a 24-hr. growth of *Rhizopus nigricans*, ATCC 6227b. The medium was placed on a rotary shaker and allowed to culture for 12 hours at about 28° C. Progesterone 2.0 g. (90% smaller than 10 microns by weight) was then added and the fermentation continued for 48 hours at about 28° C. Papergram analysis showed a 75.6% yield, 1.53 g. of 11α-hydroxyprogesterone.

*Example 8*

A shake flask containing 100 ml. of an aqueous medium consisting of 3.4 g. of commercial lactalbumin digest (Edamine), 5.5 g. of dextrose (Cerelose), 0.5 g. of corn steep liquor and 0.5 g. of brewer's yeast was adjusted to pH 5, sterilized and inoculated with a 24-hr. growth of *Rhizopus nigricans*, ATCC 6227b. The medium was placed on a rotary shaker and allowed to culture for 12 hours at about 28° C. Progesterone 2.0 g. (90% smaller than 10 microns by weight) was then added and the fermentation continued for 48 hours at about 28° C. Papergram analysis showed a 93.5% yield, 1.89 g. of 11α-hydroxyprogesterone.

The above procedure was repeated using one-half the amount of Cerelose (2.5 g.) to give essentially identical results.

In the same manner, Torula yeast can be substituted for brewer's yeast in Example 8 to give equally high yields of 11α-hydroxyprogesterone.

We claim:

1. In the process for the microbiological conversion of comminuted progesterone having a particle-size distribution 90% smaller than 10 microns to 11α-hydroxyprogesterone using *Rhizopus nigricans* under submerged aerobic fermentation conditions, the improvement which comprises: carrying out the microbiological conversion at a substrate level within the range of from 15 to 40 grams per liter of a nutrient medium, wherein the assimilable nitrogen is provided by a member selected from the group consisting of soybean meal, cottonseed meal, fish meal, coconut meal, commercial yeasts, lactalbumin digests and mixtures thereof.

2. In the process for the microbiological conversion of progesterone to 11α-hydroxyprogesterone using *Rhizopus nigricans* under submerged fermentation conditions, the improvement which comprises: employing progesterone having a particle-size distribution of 90% smaller than 10 microns, at a substrate level within the range of from 15 to 40 grams per liter of a nutrient medium wherein the source of assimilable nitrogen is provided by a member selected from the group consisting of soybean meal, cottonseed meal, fish meal, coconut meal, lactalbumin digests, commercial yeasts and mixtures thereof.

3. In the process for the microbiological conversion of progesterone to 11α-hydroxyprogesterone using *Rhizopus nigricans* under submerged fermentation conditions, the improvement which comprises: carrying out the fermentation with progesterone having a particle-size distribution of 90% smaller than 10 microns, at a substrate level within the range of from 15 to 40 grams per liter of a nutrient medium wherein the source of assimilable nitrogen is provided by soybean meal.

4. An improved process for the microbiological oxidation of progesterone to 11α-hydroxyprogesterone which comprises growing an oxygenating strain of *Rhizopus nigricans* in an aqueous nutrient medium containing assimilable sources of carbon and nitrogen wherein the nitrogen source is selected from the group consisting of soybean meal, cottonseed meal, fish meal, coconut meal, lactalbumin digests, commercial yeasts and mixtures thereof, under submerged fermentation conditions in intimate contact with comminuted progesterone, wherein substantially all particles are less than 20 microns, at a substrate level within the range of from 15 to 40 grams per liter of nutrient medium.

5. An improved process for the production of 11α-hydroxyprogesterone which comprises aerobically contacting comminuted progesterone, wherein substantially all the particles are less than 20 microns, at a substrate level within the range of from 15 to 40 grams per liter, to the oxygenating activity of *Rhizopus nigricans* in an aqueous nutrient medium wherein the source of assimilable nitrogen is provided by a member selected from the group consisting of soybean meal, cottonseed meal, fish meal, coconut meal, lactalbumin digests, commercial yeasts and mixtures thereof.

6. An improved process for the production of 11α-hydroxyprogesterone which comprises aerobically contacting comminuted progesterone, wherein substantially all the particles are less than 20 microns, at a substrate level within the range of from 15 to 40 grams per liter, to the oxygenating activity of *Rhizopus nigricans* in an aqueous nutrient medium wherein the source of assimilable nitrogen is provided by a member selected from the group consisting of soybean meal, cottonseed meal, fish meal, coconut meal, commercial yeasts, lactalbumin digests and mixtures thereof, and isolating the 11α-hydroxyprogesterone thus obtained from the fermentation medium.

7. An improved process for the production of 11α-hydroxyprogesterone which comprises aerobically contacting progesterone, having a particle-size distribution 90% smaller than 10 microns, at a substrate level within the range from 15 to 40 grams per liter to the oxygenating activity of *Rhizopus nigricans* under submerged fermentation conditions in an aqueous nutrient medium wherein the source of assimilable nitrogen is soybean meal.

8. An improved process for the production of 11α-hydroxyprogesterone which comprises aerobically contacting progesterone, having a particle-size distribution 90% smaller than 10 microns, at a substrate level within the range from 15 to 40 grams per liter to the oxygenating activity of *Rhizopus nigricans* under submerged fermentation conditions in an aqueous nutrient medium wherein the source of assimilable nitrogen is cottonseed meal.

9. An improved process for the production of 11α-hydroxyprogesterone which comprises aerobically contacting progestrone, having a particle-size distribution 90% smaller than 10 microns, at a substrate level within the range from 15 to 40 grams per liter to the oxygenating activity of *Rhizopus nigricans* under submerged fermentation conditions in an aqueous nutrient medium wherein the source of assimilable nitrogen is fish meal.

10. An improved process for the production of 11α-hydroxyprogesterone which comprises aerobically contacting progesterone, having a particle-size distribution 90% smaller than 10 microns, at a substrate level within the range from 15 to 40 grams per liter to the oxygenating activity of *Rhizopus nigricans* under submerged fermentation conditions in an aqueous nutrient medium wherein the source of assimilable nitrogen is brewer's yeast.

11. An improved process for the production of 11α-hydroxyprogesterone which comprises aerobically contacting progesterone, having a particle-size distribution 90% smaller than 10 microns, at a substrate level within the range from 15 to 40 grams per liter to the oxygenating activity of *Rhizopus nigricans* under submerged fermentation conditions in an aqueous nutrient medium wherein the nitrogen source is Torula yeast.

12. The process for the production of 11α-hydroxyprogesterone which comprises adding an aqueous suspension of progesterone, having a particle-size distribution 90% smaller than 10 microns, at a substrate level of from 15 to 40 grams per liter, to a growing culture of the microorganism *Rhizopus nigricans* in an aqueous nutrient medium under submerged aerobic fermentation conditions, wherein soybean meal is the source of assimilable nitrogen, the nitrogen concentration of the medium being within the range of from 1 to 5 grams per liter, and continuing the fermentation until a substantial amount of 11α-hydroxyprogesterone is produced.

References Cited by the Examiner
UNITED STATES PATENTS

| | | | |
|---|---|---|---|
| 2,989,439 | 6/61 | Weaver et al. | 195—51 |
| 3,019,170 | 1/62 | Weaver | 195—51 |
| 3,037,914 | 6/62 | Feldman et al. | 195—51 |

A. LOUIS MONACELL, *Primary Examiner.*